May 5, 1959  D. LEWIS, JR., ET AL  2,885,074
PACKAGING RUBBER
Filed May 24, 1957
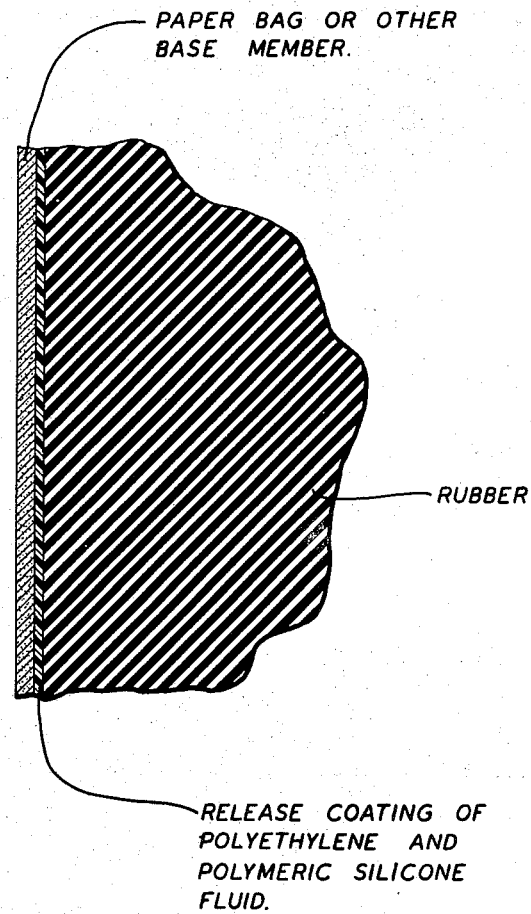
PAPER BAG OR OTHER BASE MEMBER.
RUBBER
RELEASE COATING OF POLYETHYLENE AND POLYMERIC SILICONE FLUID.
DAN LEWIS, JR.,
HAL S. NEEDHAM,
INVENTORS.
BY *Eugene P. Farley*
ATTORNEY United States Patent Office 2,885,074
Patented May 5, 1959

2,885,074
PACKAGING RUBBER

Dan Lewis, Jr., Tuscola, Ill., and Hal S. Needham, San Francisco, Calif., assignors to Crown Zellerbach Corporation, San Francisco, Calif., a corporation of Nevada Application May 24, 1957, Serial No. 661,341

16 Claims. (Cl. 206—84)

This invention relates to the packaging of rubber. More particularly, this invention pertains to a package of rubber, a container for packaging rubber, and a process of packaging rubber wherein use is made of a release coating which makes possible a clean separation of the rubber from the container in which it is packaged.

When rubber is packaged in paper containers, the paper fibers become embedded in the rubber and remain thus embedded when the paper is stripped off. This contaminates the rubber.

Accordingly, the inner surfaces of containers employed in packaging and shipping rubber heretofore have been covered with release coatings which promote clean release of the rubber. Various compositions have been suggested for this purpose, including a butadiene-styrene rubber latex mixed with clay, protein material mixed with ta'c and kaolin, butadiene-acrylonitrile rubber latex mixed with wax and zinc stearate, methylhydrogenpolysiloxane mixed with cellulose ether, wax coated with polyethylene, and the like. However, none of these coatings has been completely effective in cleanly releasing rubber from a paper surface, particularly as the plasticity and cold flow of the rubber increase from that of "hot" rubber to that of "cold" rubber and of "oil-extended" rubber.

Hence it is the general object of the present invention to provide a package of rubber and a container for packaging rubber wherein use is made of a release coating which makes possible easy and clean release of the rubber from the container in which it is packaged, even though the rubber is tacky and characterized by cold flow in high degree. Other objects of the present invention are the provision of a package of rubber and a container for packaging rubber which include a release coating which is resistant to penetration by rubber under cold flow; chemically inert to rubber; firmly adherent to the container surface; dry, non-tacky, smooth and flexible at room temperature; and relatively low in cost so that a stable, inexpensive container and package may be provided which will not contaminate the rubber content either with fibrous lignocellulosic particles or with foreign bodies derived from the release coating.

As is apparent from the single figure of the drawings, the herein described container for packaging rubber comprises a base member made of paper or other suitable material, and adherently united thereto a release coating comprising a cured mixture of low molecular weight polyethylene and polymeric silicone fluid. Application of this release coating insures that the rubber will not adhere to the inner walls of the container in which it is placed during filling, handling, shipping, or removal even though the rubber is highly plastic and the temperature is as high as 140° F.

The base member employed in the herein described container may be fabricated from any suitable material such as cloth, wood, metal, fiberboard, or paper. It may be used in the form of flat sheets, as where the final product is to be used as separator sheets in camelback rubber processing, or in the form of bags, boxes, cartons, etc. Preferably, the base member comprises a paper sheet, particularly a kraft paper sheet, which may be used as a liner for various types of containers, or as the innermost ply in a multiwall paper bag.

Where paper is employed as the base member, it should have high strength properties, a high densometer value, low bulk index, and a high finish. It should be well sized to prevent excessive penetration of the coating. If desired, its physical properties may be further enhanced by the inclusion of wet strength resins, starch, or other pulp additives.

The basis weight of the paper sheet employed herein may vary over a broad range of from about 30 to about 200 pounds per ream (3000 square feet). However, when the sheet is to be used as a liner for containers, as an inner ply for multiwall bags, or for conversion into a single ply bag, it is preferred to employ a sheet having a basis weight of from 40–80 pounds per ream.

The inner surfaces of the foregoing or other suitable base members are coated with an aqueous coating emulsion comprising a low molecular weight polyethylene and polymeric silicone fluid. Although the proportions of these constituents are variable depending, for example, on the properties of the rubber to be packaged, there may be employed in general a mixture of from 1–95% polyethylene and from 5–99% silicone fluid, the proportions being expressed by weight, solids basis. Preferred proportions of these two ingredients are from 70–90% and 10–30% by weight, respectively.

The first essential constituent, i.e. the polyethylene, forms strong, flexible films characterized by high resistance to wetting and penetration by moisture, as well as by high scuff resistance. Although its molecular weight is variable, a polyethylene satisfactory for incorporation in the release coating composition of this invention is one having a low molecular weight in the range of from 1,000–10,000, preferably from 2,000 to 4,000. Such resins are available commercially in the form of liquid emulsions or dispersions.

The other essential constituent of the herein described coating composition, namely the polymeric silicone fluid, comprises those fluid silicones which are heat stable, oily liquids having low vapor pressures and high flash points. They are available in viscosities of between 0.65 centistoke and 1,000,000 centistokes and even higher. Their viscosity changes but little with temperature change. They are inert chemically, very stable at elevated temperatures and have low freezing points.

The silicone fluids as a class are characterized fully in McGregor, "Silicones and Their Uses," pages 35–87 (McGraw-Hill 1954). Preferred silicone fluids for use herein are the fluid hydroxylated alkyl polysiloxanes, and mixtures thereof with the alkyl hydrogen polysiloxanes such as are described in the pending patent application of Firth L. Dennett, Serial No. 454,613, filed September 7, 1954, now U.S. Patent No. 2,807,601. The fluid alkyl hydrogen polysiloxanes such as are described in Dennett, U.S. 2,588,367 are also applicable. Other suitable silicones are characterized in Kaiser et al., U.S. 2,690,255.

To accelerate the curing rate of the silicone fluid it is desirable to incorporate a catalyst such as a metal salt of a carboxylic acid therein. Particularly suitable catalysts for this purpose comprise the zinc, tin, iron, copper and lead salts of the carboxylic acids, particularly of acetic, butyric, caprylic and stearic acid. Tin caprylate emulsified with 10% lauryl sulfate is highly satisfactory when used as a 20% liquid dispersion. In general, the catalyst should be used in amount of from 0.1 to 4%, preferably from 0.5 to 2.5% by weight of the metal constituent, based on the weight of the silicone fluid.

Where the silicone fluid includes a catalyst, it is desirable to stabilize the polyethylene to avoid a possibility of coagulating it. To this end, from 0.1 to 10%, preferably from 1-5% based on the total coating mixture solids, of a suitable water-soluble non-ionic stabilizer such as an alkyl phenyl polyoxyethylated ether may be used. Another suitable stabilizer is the reaction product of para-octyl phenol and ethylene oxide.

In preparing the coating composition, it has been found preferable first to mix the polyethylene and silicone fluid emulsions and then to add the stabilizer. The catalyst, in the form of a liquid dispersion, may be diluted if necessary with water in a ratio of 1 part of catalyst dispersion to from about 10-150 parts of water in order to avoid possible coagulation of the mixture which may occur if the concentration of the catalyst is too strong.

The catalyst then is added slowly with stirring to the emulsion and the stirring continued until a uniform mixture is obtained. The catalyst should be incorporated in the mixture preferably prior to the coating operation, as the stability at room temperature of the emulsion containing the catalyst is limited to about 48 hours or less, depending upon the amount of catalyst employed.

Water or other suitable liquid media may be added to the coating emulsion so that its final viscosity at 25° C. will fall in the range of from 5-5000 centipoises, preferably from 10-500 centipoises and its solids content from 3-40%, preferably 15-30% by weight.

The coating composition may be applied to the paper or other base member by any conventional procedure, such as spraying, brushing, spreading or roll coating. Care should be taken, however, that the coating be applied in such a manner as to produce a continuous, smooth film of uniform weight. The amount of the coating should be sufficient to insure an easy and clean release of the coated surface, when dry, from the rubber to be packaged. In general, an application of from about 1-50 pounds, preferably from 2-10 pounds (dry basis) of coating per 3000 square feet of base member will be satisfactory.

The sheet of paper or other base member coated on one side with the herein above described emulsion is substantially dried at a temperature between 200° F. and 350° F., preferably between 250° F. and 275° F., by hot air, or by passing it over one or more drum driers, or in any other suitable manner, until a dry, non-tacky, continuous, smooth coating film is produced in which the catalyzed silicone compound is substantially cured. In general, a drying time of from 10-120 seconds, preferably from 30-60 seconds will be sufficient.

When thus applied, the polyethylene and polymeric silicone fluid combine to form a release coating which is uniform and homogeneous. Since the two essential components of the coating are compatible with each other, the coating is stable in storage and in use. Since it is substantially non-volatile, its composition is not altered during storage, even though it is subjected to elevated temperatures.

The coated sheet may be employed as a liner for any type of a suitable container. Also, it may be converted to a single ply bag, or used as the innermost ply in a multiwall bag, the coated side of the sheet forming the inner surface of the bag so that it is in contact with the rubber packaged therein.

The bag or other coated container then may be filled in the usual manner with the rubber product to be packaged. This product may comprise natural rubber or any of the commercial synthetic rubbers including neoprene, butyl rubber, Thiokol, polyisobutylene, polystyrene, polymeric butadiene-acrylonitrile, polymeric butadiene-styrene and the like. As has been indicated above, it may be used successfully for packaging such rubber products even though they are characterized by high plasticity and cold flow.

The following examples illustrate the invention:

Example 1

A coating emulsion was prepared which consisted of 90% by weight polyethylene and 10% by weight polymeric silicone fluid. The polyethylene was a partially oxidized polyetheylene prepared by admixing 12 parts by weight of morpholine oleate with 30 parts by weight of the polyethylene solids at 110° C., and stirring the melt with sufficient boiling water to form a uniform emulsion containing 20% solids by weight ("A.C. 629," Somet-Solvay Petrochemical Division of Allied Chemical and Dye Corp.). The resulting product had an off-white color, a specific gravity of 0.93, a molecular weight of 2000, a melting point of 205-8° F., an acid number of 14-17, and a saponification number of 14-17.

The polymeric silicone fluid employed was a light colored emulsion having a specific gravity at 25° C. of 1.0, a pH of 6-7, and a non-volatile content of 40% ("XEF-5067"; Dow Corning Corp.).

The two foregoing emulsions were mixed together and thereafter 5% by weight, solids basis, of a stabilizer consisting of the reaction product of 1 mol of paraoctyl phenol and 10 mols of ethylene oxide ("Triton X-100"; The Rohm and Haas Co.) was added with continuous stirring. Finally, an emulsified catalyst comprising tin caprylate emulsified with 10% lauryl sulfate as a dispersant ("XEY-21"; Dow Corning Corp.) was diluted with 20 volumes of water and added slowly to the mixture in the amount of 1% catalyst based on the emulsion solids. The mixture was stirred until a uniform coating emulsion having a 20% solids content was obtained. The final viscosity of the emulsion was 15 centipoises at 25° C.

The foregoing coating emulsion was applied to a base member comprising a high finish, unbleached kraft paper sheet of 51.6 pounds per ream (3000 square feet) basis weight, having a caliper of 4.2 mils, a bursting strength of 95%, a densometer of 57 seconds/100 m., and a Sheffield smoothness of 102 ml./min. and a moisture content of about 8%. This paper was uniformly coated on one side with the above composition, then passed through a hot-air oven at about 260° F. so as to produce a substantially dry, non-tacky coating film, the weight of which was 2.5 pounds per ream of paper. This coating film was firmly bonded to the base sheet.

A sheet of this coated paper was employed as the inner ply of a three-ply multiwall paper bag, the coated side forming the inner surface of the bag. The bag was filled with pieces of GR-S rubber and the package was stored for 6 months under a pressure of 2 pounds/square inch to simulate a pressure which would be exerted on the bottom package in a stack of ten similar rubber-containing packages. At the end of this period, the coated bag released easily and cleanly from the rubber packaged therein without any contamination thereof. The coating film still adhered firmly to the base sheet.

Example 2

A coating emulsion containing 80% polyethylene and 20% by weight fluid silicone was prepared in the same manner as is described in Example 1. The polyethylene was used in the form of a 30% solids emulsion ("Aquex 16N"; Aquex Dev. and Sales Corp.). The silicone, stabilizer and catalyst were the same as in Example 1, but the stabilizer and catalyst were used in amounts of 2.4% and 2%, respectively, based on the emulsion solids. The final coating emulsion had a 21% solids content and a viscosity of 12 centipoises at 25° C.

The base member employed was a high-finish, unbleached kraft paper sheet having a basis weight of 59.8 pounds per ream, a caliper of 5.2 mils, a bursting strength of 105%, a densometer of 53 seconds/100 ml., a Sheffield smoothness of 182 ml./min., and a moisture content of about 8.5%. The paper was coated with 2.5 lbs./ream of the above composition, converted into a three-ply multiwall bag, filled with GR-S rubber and stored in the same manner as described in Example 1.

The container formed in accordance with this example proved highly satisfactory for packaging rubber, as its release properties were essentially the same as those of the container of Example 1.

*Example 3*

A release coating emulsion was prepared from 76% by weight polyethylene and 24% by weight silicone fluid. All the ingredients of the emulsion and the method of its preparation were the same as in Example 2. However the final emulsion had a 30% solids content and a viscosity of 10 centipoises at 25° C.

The same paper as used in Example 2 was coated with the emulsion to give a dry coating weight of 5 pounds/ream, then converted into a three-ply multiwall bag, filled with GR-S rubber and stored in the same manner as set forth in Example 1. The resulting container had the same excellent release characteristics as that of Example 1.

From the above examples, it is apparent that the containers of this invention are highly satisfactory for packaging and shipping rubber. The superior release characteristics of the coating film adherently united to the inner surface of the container give the container a long sought and desirable property of being capable of an easy and clean release from the tacky rubber packaged therein. Furthermore, these release properties are not adversely affected by prolonged storage of the packaged rubber.

Having thus described our invention, we claim:

1. A package of rubber comprising rubber, a base member, and intermediate the base member and the rubber a substantially non-tacky continuous release coating adherently united to the base member and comprising essentially a dried and cured mixture of low molecular weight polyethylene and polymeric silicone, whereby an easy and clean release of the coated base member from the rubber upon removal of the rubber from the package is obtained.

2. The package of rubber of claim 1 wherein the rubber comprises natural rubber.

3. The package of rubber of claim 1 wherein the rubber comprises synthetic polymeric butadiene-styrene.

4. The package of rubber of claim 1 wherein the base member comprises a paper sheet.

5. The package of rubber of claim 1 wherein the release coating comprises essentially a cured mixture of from 1–95% by weight of polyethylene having a molecular weight of from 1,000 to 10,000, and 5–99% by weight of polymeric silicone.

6. A package of rubber comprising rubber, a paper base sheet, and intermediate the paper base sheet and the rubber a substantially non-tacky, continuous release coating adherently united to the paper base sheet and comprising essentially a mixture of from 1–95% by weight of polyethylene having a molecular weight of from 1,000 to 10,000 and from 5–99% by weight of cured polymeric silicone whereby an easy and clean release of the coated base sheet from the rubber upon removal of the rubber from the package is obtained.

7. A container for packaging rubber comprising a base member having on the innermost surface thereof a substantially non-tacky, continuous release coating comprising essentially a cured and dried mixture of low molecular weight polyethylene and polymeric silicone, said coating being firmly united to said base member to insure easy and clean release of the coated base member from rubber to be packaged in the container.

8. The container of claim 7 wherein the base member comprises paper.

9. The container of claim 7 wherein the base member comprises a multi-wall paper bag.

10. The container of claim 7 wherein the polyethylene constituent of the release coating has a molecular weight of from 1,000 to 10,000.

11. The container of claim 7 wherein the polymeric silicone constituent of the release coating comprises a hydroxylated alkyl polysiloxane.

12. The container of claim 7 wherein the release coating comprises a cured mixture of from 1–95% by weight of stabilized polyethylene having a molecular weight of from 1,000 to 10,000 and from 5–99% by weight of catalyzed polymeric silicone.

13. The container of claim 7 wherein the amount of the release coating on the base member is from 1–50 pounds (dry basis) of release coating for each 3,000 square feet of base member.

14. A container for packaging rubber comprising a paper base sheet having on the inner surface thereof and adherently united thereto a substantially non-tacky, continuous release coating comprising essentially a dried mixture of from 1–95% by weight of polyethylene having a molecular weight of from 1,000 to 10,000 and from 5–99% by weight of cured alkyl hydrogen polysiloxane, the amount of the release coating on said base sheet being from 1–50 pounds of release coating for each 3,000 square feet of base sheet, whereby an easy and clean release of the coated sheet from rubber to be packaged in the container is insured.

15. A method of packaging rubber which comprises providing a container having the innermost surface thereof coated with a dry, non-tacky, smooth film comprising essentially a cured mixture of low molecular weight polyethylene and polymeric silicone, and filling the container with rubber whereby the container may thereafter be easily and cleanly separated from the rubber packaged therein, the film remaining firmly united with said container.

16. A method of packaging rubber which comprises providing a multi-wall paper bag having the innermost surface thereof coated with a dry, non-tacky, smooth film comprising essentially from 1–95% by weight of stabilized, low molecular weight polyethylene and from 5–99% by weight of catalyzed substantially cured polymeric silicone, the dry weight of the film being from 1–50 pounds per 3,000 square feet of bag surface, and filling the bag with rubber, whereby the bag may be separated easily and cleanly from the rubber packaged therein, the film remaining firmly united to the innermost surface of said bag.

References Cited in the file of this patent

UNITED STATES PATENTS

| 2,648,487 | Linda | Aug. 11, 1953 |
| 2,762,504 | Sparks et al. | Sept. 11, 1956 |

FOREIGN PATENTS

| 508,732 | Canada | Jan. 4, 1955 |